United States Patent
Olson et al.

(10) Patent No.: US 9,734,059 B2
(45) Date of Patent: Aug. 15, 2017

(54) METHODS AND APPARATUS FOR DATA CACHE WAY PREDICTION BASED ON CLASSIFICATION AS STACK DATA

(71) Applicant: ADVANCED MICRO DEVICES, INC., Sunnyvale, CA (US)

(72) Inventors: Lena E. Olson, Madison, WI (US); Yasuko Eckert, Kirkland, WA (US); Vilas K. Sridharan, Brookline, MA (US); James M. O'Connor, Austin, TX (US); Mark D. Hill, Madison, WI (US); Srilatha Manne, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 346 days.

(21) Appl. No.: 13/945,659

(22) Filed: Jul. 18, 2013

(65) Prior Publication Data
US 2014/0143499 A1    May 22, 2014

Related U.S. Application Data

(60) Provisional application No. 61/728,843, filed on Nov. 21, 2012.

(51) Int. Cl.
*G06F 12/08* (2016.01)
*G06F 12/0802* (2016.01)
(Continued)

(52) U.S. Cl.
CPC ...... *G06F 12/0802* (2013.01); *G06F 12/0848* (2013.01); *G06F 12/0862* (2013.01);
(Continued)

(58) Field of Classification Search
None
See application file for complete search history.

(56) References Cited

U.S. PATENT DOCUMENTS

| | | | |
|---|---|---|---|
| 5,434,990 | A | 7/1995 | Moussavi et al. |
| 5,764,946 | A | 6/1998 | Tran et al. |

(Continued)

FOREIGN PATENT DOCUMENTS

| | | | | |
|---|---|---|---|---|
| JP | 2012027652 | A | * 2/2012 | |
| WO | WO 0245385 | A2 | * 6/2002 | ......... G06F 9/30181 |

OTHER PUBLICATIONS

Calder, B et al. Predictive Sequential Associative Cache. HPCA '96 Proceedings of the 2nd IEEE Symposium on High-Performance Computer Architecture, 1996, pp. 244-253 [online], [retrieved Jun. 17, 2015]. Retrieved from the Internet <URL: http://dl.acm.org/citation.cfm?id=822662>.*

Machine translation of Mori, JP 2012027652 A. Published Feb. 9, 2012.*

(Continued)

*Primary Examiner* — Reginald Bragdon
*Assistant Examiner* — James J Thomas

(57) ABSTRACT

A method of way prediction for a data cache having a plurality of ways is provided. Responsive to an instruction to access a stack data block, the method accesses identifying information associated with a plurality of most recently accessed ways of a data cache to determine whether the stack data block resides in one of the plurality of most recently accessed ways of the data cache, wherein the identifying information is accessed from a subset of an array of identifying information corresponding to the plurality of most recently accessed ways; and when the stack data block resides in one of the plurality of most recently accessed ways of the data cache, the method accesses the stack data block from the data cache.

11 Claims, 8 Drawing Sheets

(51) Int. Cl.
*G06F 12/0875* (2016.01)
*G06F 12/123* (2016.01)
*G06F 12/0846* (2016.01)
*G06F 12/0864* (2016.01)
*G06F 12/0862* (2016.01)

(52) U.S. Cl.
CPC ...... *G06F 12/0864* (2013.01); *G06F 12/0875* (2013.01); *G06F 12/123* (2013.01); *G06F 2212/451* (2013.01); *G06F 2212/6032* (2013.04); *Y02B 60/1225* (2013.01)

(56) References Cited

U.S. PATENT DOCUMENTS

| | | | |
|---|---|---|---|
| 5,787,469 | A | 7/1998 | Merrell |
| 5,835,744 | A | 11/1998 | Tran et al. |
| 5,903,910 | A * | 5/1999 | Tran et al. ............ 711/132 |
| 5,953,740 | A | 9/1999 | King et al. |
| 6,038,643 | A | 3/2000 | Tremblay et al. |
| 6,058,457 | A | 5/2000 | Tremblay et al. |
| 6,067,602 | A | 5/2000 | Tremblay et al. |
| 6,092,152 | A | 7/2000 | Tremblay et al. |
| 6,125,439 | A | 9/2000 | Tremblay et al. |
| 6,138,210 | A | 10/2000 | Tremblay et al. |
| 6,167,488 | A | 12/2000 | Koppala |
| 6,532,531 | B1 | 3/2003 | O'Connor et al. |
| 6,742,112 | B1 | 5/2004 | Yoaz et al. |
| 6,950,923 | B2 | 9/2005 | O'Connor et al. |
| 6,961,843 | B2 | 11/2005 | O'Connor et al. |
| 7,065,613 | B1 * | 6/2006 | Flake et al. ............ 711/132 |
| 7,536,510 | B1 * | 5/2009 | Thompson ............ 711/128 |
| 7,702,855 | B2 | 4/2010 | Rosen et al. |
| 2004/0139374 | A1 | 7/2004 | Meaney et al. |
| 2004/0148467 | A1 * | 7/2004 | Hooker ............ G06F 9/3004 711/132 |
| 2005/0050278 | A1 | 3/2005 | Meier et al. |
| 2007/0038810 | A1 | 2/2007 | Rosen et al. |
| 2008/0235453 | A1 * | 9/2008 | Emma et al. ............ 711/122 |
| 2009/0328022 | A1 * | 12/2009 | Brogan ............ G06F 12/0897 717/168 |

OTHER PUBLICATIONS

Rodrigo Gonzalez-Alberquilla et al., "Stack Oriented Data Cache Filtering", Univ. Complutense de Madrid, Ciudad Universitaria s/n, Madird, Spain 28040, CODES+ISSS'09, Oct. 11-16, 2009.
Power Point Presentation "Cache Coherency" CSE P548—Cache Coherence; Autumn 2006.
Hsien-Hsin S. Lee et al., "Stack Value File: Custom Microarchitecture for the Stack", Advanced Computer Architecture Lab, University of Michigan, Jan. 2001.
www.codeproject.com., Shivprasad Koirala, "Six important. Net concepts: Stack, heap, value types, reference types, boxing, and unboxing", Article Published May 14, 2012.
Koji Inoue et al., "Way-Predicting Set-Associative Cache for High Performance and Low Energy Consumption", Department of Computer Science and Communication Engineering Kyushu Univeristy, Kasuga-Koen, Kasuga, Fukuoka, Japan ISLPED99, 1999.
Michael D. Powell, et al., "Reducing Set-Associative Cache Energy via Way-Prediction and Selective Direct-Mapping", School of Electrical and Computer Engineering, Purdue University, Proceedings of the 34th Int'l Symposium on Microarchitecture (MICRO), 2001.
Basu, A.; Hill, M.D.; Swift, MM.; "Reducing memory reference energy with opportunistic virtual caching," Computer Architecture (ISCA), 2012 39th Annual International Symposium on , vol., no., pp. 297-308, Jun. 9-13, 2012.
U.S. Appl. No. 13/945,620, filed Jul. 18, 2013, listing Lena E. Olson et al. as inventor(s), entitled "Methods and Apparatus for Filtering Stack Data Within a Cache Memory Hierarchy".
U.S. Appl. No. 13/887,196, filed May 3, 2013, listing Lena E. Olson et al. as inventor(s), entitled "Stack Cache Management and Coherence Techniques".
U.S. Appl. No. 13/946,112, filed Jul. 19, 2013, listing Lena E. Olson et al. as inventor(s), entitled "Methods and Apparatus for Soft-Partitioning of a Data Cache for Stack Data".
U.S. Appl. No. 14/018,562, filed Sep. 5, 2013, listing Yasuko Eckert et al. as inventor(s), entitled "Using Predictions for Store-to-Load Forwarding".
U.S. Appl. No. 61/728,843, filed Nov. 21, 2012, listing Yasuko Eckert et al. as inventor(s), entitled "Revisiting Stack Caches for Energy Efficiency".

\* cited by examiner

| Way 0 | MRU |
|---|---|
| Way 1 | MRU + 1 |
| Way 2 | MRU + 2 |
| Way 3 | MRU + 3 |
| Way 4 | MRU + 4 |
| Way 5 | MRU + 5 |
| Way 6 | MRU + 6 |
| Way 7 | LRU |

FIG. 5A

| Way 0 | MRU + 1 |
|---|---|
| Way 1 | MRU + 2 |
| Way 2 | MRU + 3 |
| Way 3 | MRU + 4 |
| Way 4 | MRU |
| Way 5 | MRU + 5 |
| Way 6 | MRU + 6 |
| Way 7 | LRU |

FIG. 5B

METHODS AND APPARATUS FOR DATA CACHE WAY PREDICTION BASED ON CLASSIFICATION AS STACK DATA

CROSS-REFERENCE TO RELATED APPLICATION

This application claims the benefit of U.S. provisional patent application Ser. No. 61/728,843, filed Nov. 21, 2012.

TECHNICAL FIELD

Embodiments of the subject matter described herein relate generally to way prediction and manipulation in a cache memory environment. More particularly, embodiments of the subject matter relate to way prediction and soft-partitioning of a data cache based on stack versus non-stack classification of data.

BACKGROUND

A central processing unit (CPU) may include or cooperate with one or more levels of a cache hierarchy in order to facilitate quick access to data. This is accomplished by reducing the latency of a CPU request of data in memory for a read or a write operation. Generally, a data cache is divided into sections of equal capacity, called cache "ways", and the data cache may store one or more blocks within the cache ways. Each block is a copy of data stored at a corresponding address in the system memory.

Cache ways are accessed to locate a specific block of data, and the energy expenditure increases with the number of cache ways that must be accessed. For this reason, it is beneficial to utilize methods of operation that limit the number of ways that are necessarily accessed in the search for a particular block of data.

BRIEF SUMMARY OF EMBODIMENTS

Some embodiments provide a method of way prediction for a data cache having a plurality of ways. Responsive to an instruction to access a stack data block, the method accesses identifying information associated with a plurality of most recently accessed ways of a data cache to determine whether the stack data block resides in one of the plurality of most recently accessed ways of the data cache, wherein the identifying information is accessed from a subset of an array of identifying information corresponding to the plurality of most recently accessed ways; and when the stack data block resides in one of the plurality of most recently accessed ways of the data cache, the method accesses the stack data block from the data cache.

Some embodiments provide a set-associative cache memory system. The system includes a first array of ways of the cache memory system, wherein the ways are configured to store N recently accessed data blocks, wherein N is an integer greater than one; a second array of storage elements, configured to store identifying information associated with the N recently accessed data blocks; and cache control circuitry operatively associated with the first and second arrays, wherein the cache control circuitry is configured to respond to a request to access a stack data block by: accessing identifying information associated with a designated number of recently accessed ways of a data cache to determine whether the stack data block resides in one of the designated number of recently accessed ways of the data cache, wherein the identifying information is accessed from a subset of an array of identifying information corresponding to the designated number of most recently accessed ways; and when the stack data block resides in one of the designated number of most recently accessed ways of the data cache, accessing the stack data block from the data cache.

Some embodiments provide a method of way prediction for a data cache comprising a plurality of sets, each of the plurality of sets comprising a plurality of ways. The method receives an instruction, at a processor-based device, to access a block of stack data, wherein the instruction comprises a first tag associated with the block of stack data; performs a first tag lookup within a tag array, to determine whether a copy of the first tag resides in a subset of the tag array corresponding to a plurality of recently used ways of the data cache; and when a copy of the first tag resides in the subset of the tag array, accesses the block of stack data from one of the plurality of most recently used ways of the data cache corresponding to the copy of the first tag.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 5A-5B are block diagram representations that depict an embodiment of data cache recency information before and after updating;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to regulate the energy expended in the operation of a data cache within a computer system. In some embodiments, a request to manipulate a block of stack data is received, including an address for the location in main memory where the block of stack data is located. Once the request is received, the system will access cache memory to detect whether the requested block of stack data resides within the data cache, to accommodate faster and less resource-intensive access than if the system were required to access the block of stack data at the location in main memory in which the block of stack data resides.

Within the context of this application, two embodiments are described to address the previously described situation (i.e., storing and/or accessing stack data within a data cache). In accordance with a first embodiment, the system reads the data cache recency information to determine the most recently used (MRU) ways of the data cache and access their contents, predicting that stack data will always be located within a specified plurality of MRU ways of the data cache. In accordance with a second embodiment, the system routes all blocks of stack data to one or more specified ways of the data cache, and during all future accesses of that particular block of stack data, the system will only access the specified way(s) within the data cache.

Figure 1:
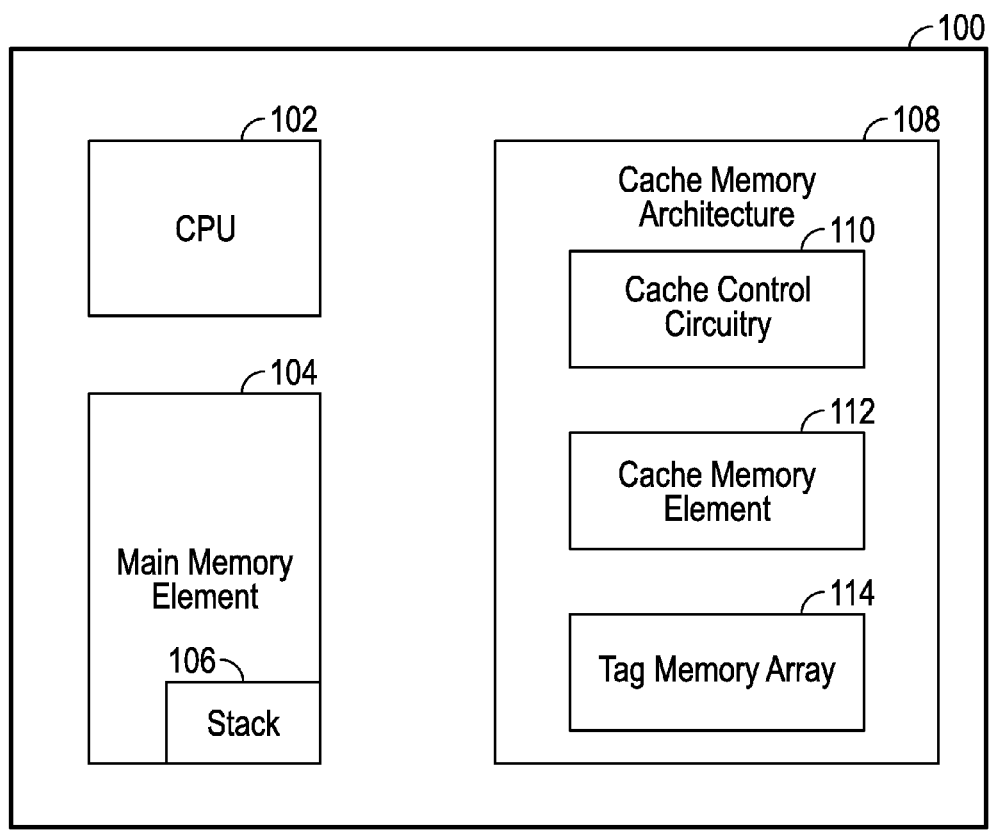
FIG. 1 is a simplified block diagram of an embodiment of a processor system.

Referring now to the drawings, FIG. 1 is a simplified block diagram of an embodiment of a processor system 100. In accordance with some embodiments, the processor system 100 may include, without limitation: a central processing unit (CPU) 102; a main memory element 104; and a cache memory architecture 108. These elements and features of the processor system 100 may be operatively associated with one another, coupled to one another, or otherwise configured to cooperate with one another as needed to support the desired functionality—in particular, the cache way prediction and cache management functionality described herein. For ease of illustration and clarity, the various physical, electrical, and logical couplings and interconnections for these elements and features are not depicted in FIG. 1. Moreover, it should be appreciated that embodiments of the processor system 100 will include other elements, modules, and features that cooperate to support the desired functionality. For simplicity. FIG. 1 only depicts certain elements that relate to the stack cache management techniques described in more detail below.

The CPU 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. The CPU 102 represents a processing unit, or plurality of units, that are designed and configured to execute computer-readable instructions, which are stored in some type of accessible memory, such as main memory element 104.

Main memory element 104 represents any non-transitory short or long term storage or other computer-readable media capable of storing programming instructions for execution on the processor(s) 110, including any sort of random access memory (RAM), read only memory (ROM), flash memory, magnetic or optical mass storage, and/or the like. As will be recognized by those of ordinary skill in the art, a main memory element 104 is generally comprised of RAM, and, in some embodiments, the main memory element 104 is implemented using Dynamic Random Access Memory (DRAM) chips that are located near the CPU 102.

The stack 106 resides within the main memory element 104, and may be defined as a region of memory in a computing architecture where data is added or removed in a last-in, first-out (LIFO) manner. Stack data may be defined as any data currently located in the stack 106. Generally, the stack 106 is utilized to provide storage for local variables and other overhead data for a particular function within an execution thread, and in multi-threaded computing environments, each thread will have a separate stack for its own use. However, in some embodiments, a stack may be shared by multiple threads. The stack 106 is allocated, and the size of the stack 106 is determined, by the underlying operating system. When a function is called, a pre-defined number of cache lines are allocated within the program stack. One or more cache lines may be "pushed" onto the stack 106 for storage purposes, and will be "popped" off of the stack 106 when a function returns (i.e., when the data on the stack 106 is no longer needed and may be discarded). In some embodiments, it is also possible that the stack 106 may be popped before the function returns. Due to the nature of the LIFO storage mechanism, data at the top of the stack 106 is the data that has been "pushed" onto the stack 106 the most recently, and will be the data that is "popped" off of the stack 106 first. The stack 106 is often implemented as virtual memory that is mapped to physical memory on an as-needed basis.

The cache memory architecture 108 includes, without limitation, cache control circuitry 110, a cache memory array 112, and a tag memory array 114. For implementation purposes, these components may be implemented using multiple chips or all may be combined into a single chip.

The cache control circuitry 110 contains logic to manage and control certain functions of the cache memory architecture 108. For example, and without limitation, the cache control circuitry 110 may be configured to maintain consistency between the cache memory architecture 108 and the main memory element 104, to update the cache memory array 112 and tag memory array 114 when necessary, to implement a cache write policy, to determine if requested data located within the main memory element 104 is also located within the cache, and to determine if a specific block of requested data is located within the main memory element 104 is cacheable.

The cache memory array 112 is the portion of the cache that holds all data stored within the cache. The cache memory array 112 is most commonly implemented using static random access memory (SRAM), but may also be implemented using other forms of random access memory (RAM) or other computer-readable media capable of storing programming instructions. The size of the cache memory array 112 is determined by the size of the cache memory architecture 108, and will vary based upon individual implementation. A cache memory array 112 may be configured or arranged such that it contains "sets", which may be further subdivided into "ways" of the data cache. Within the context of this application, sets and/or ways of a data cache may be collectively referred to as storage elements, cache memory storage, storage sub-elements, and the like.

The tag memory array 114 stores the addresses (or a portion thereof) of each block of data that is stored within the cache memory array 112. The addresses refer to specific locations in which data blocks reside in the main memory element 104, and may be implemented using physical memory addresses, virtual memory addresses, or a combination of both. The tag memory array 114 will generally consist of Random Access Memory (RAM), and in some embodiments, comprises Static Random Access Memory (SRAM). In some embodiments, the tag memory array 114 will be referred to as a tag array. A tag array may be further subdivided into storage elements for each tag stored.

Figure 2:
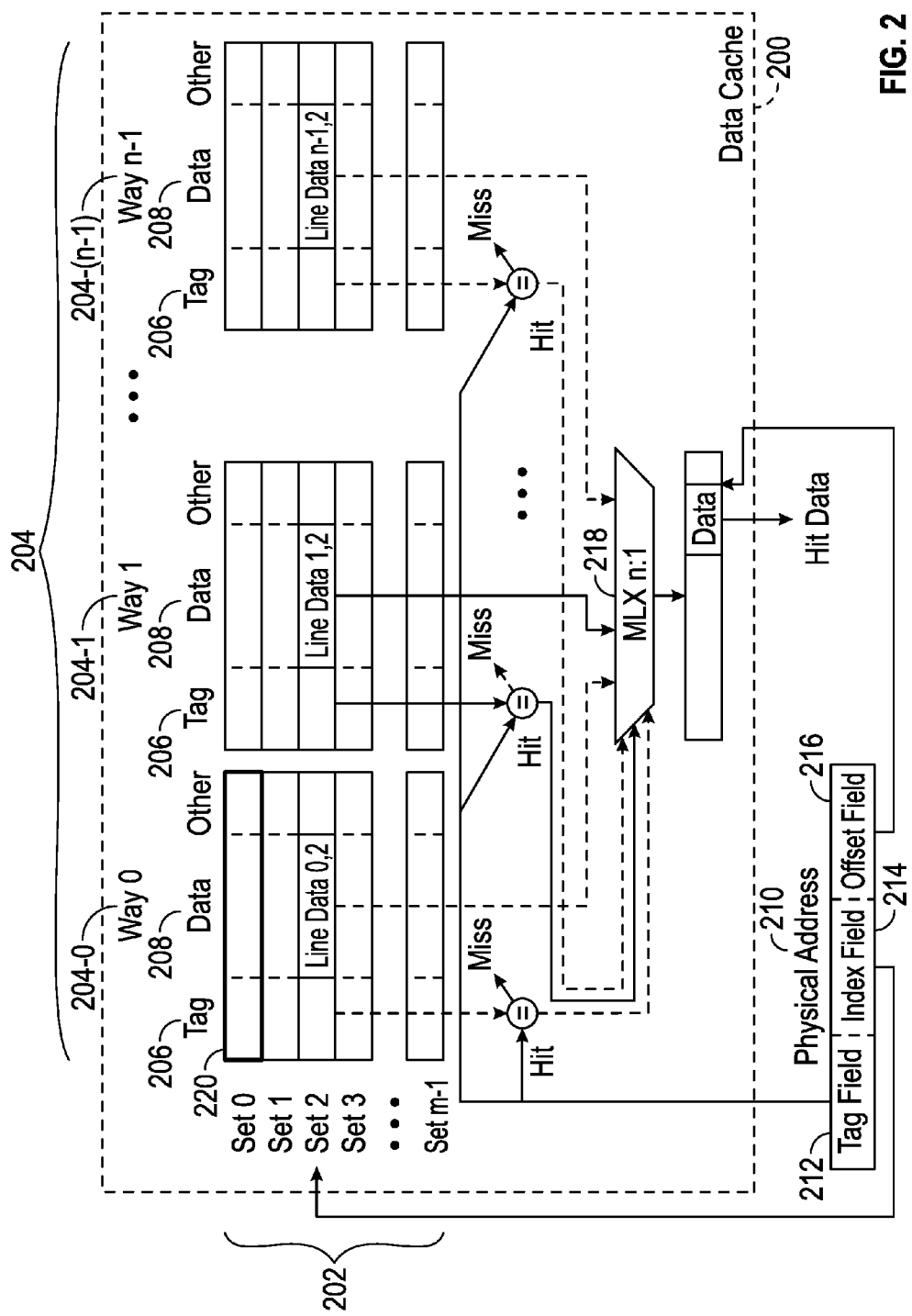
FIG. 2 is a block diagram representation of an embodiment of a cache memory environment.

FIG. 2 is a block diagram representation of an embodiment of a cache memory environment. An N-way, set-associative data cache 200, organized as an array of cache lines, is shown. The data cache 200 contains M sets 202. Each set 202 contains N ways 204, and consequently each set 202 is a collection of N cache lines 220, where each cache line 220 of a set 202 resides within a unique way of the data cache 200.

A cache line 220 may also be referred to as a cache entry or a cache block. Each cache line 220 is associated with a cache line tag 206 and cache line data 208. As shown, each cache line tag 206 resides within the same structure as the associated cache line data 208. However, in some embodiments, the cache line tags 206 associated with the contents of the ways 204 of the data cache 200 are stored in a separate structure. Cache line data 208 is a fixed-size copy of a block of data that resides in the main memory of the system, and a cache line tag 206 is a unique identifier associated with the memory address of the location within the main memory where the associated cache line data 208 resides.

The data cache 200 is depicted with the capability of performing comparison operations between cache line data 208, residing within a way (204-0, 204-1, 204-($n$−1)) of the data cache 200, and a block of data residing in the main memory of the system. This situation presents itself when a core pipeline of a system initiates a request to access data for manipulation within the system, and a search of the data cache 200 for a copy of the relevant associated data block must be made. The request to manipulate a data block includes a physical address 210 for the request to manipulate the data block.

All of the information needed to potentially locate a copy of the data block in the data cache 200 is given in the physical address 210. As shown, the physical address 210 includes a tag field 212, an index field 214, and an offset field 216. The offset field 216 is used to locate a subset of data within the data block in the data cache 200. The index field 214 identifies the set 202 of the data cache 200 that will be searched for the copy of the data block. The tag field 212 is compared against all cache line tags in the identified set 202, and contains a unique identifier for the data block.

The data cache 200 utilizes an N:1 multiplexer 218, which receives input from each way (204-0, 204-1, 204-($n$−1)) within a selected set 202, and forwards a selected input to a single line output. As is commonly known in the art, each cache line data 208 within a set is a separate input to the multiplexer. As shown, the tag field 212 of the physical address 210 is compared to the cache line tag 206 for each cache line 220 of a selected set 202. When there is a match between the two tags, a "hit" has occurred, and this information would be applied to the appropriate select lines of the multiplexer 218 so that data from the corresponding input is passed to the multiplexer 218 output. In this example, a hit is shown to have occurred at Set 2, Way 1, and the associated cache line data 208 is selected and output from the multiplexer 218.

Figure 3:
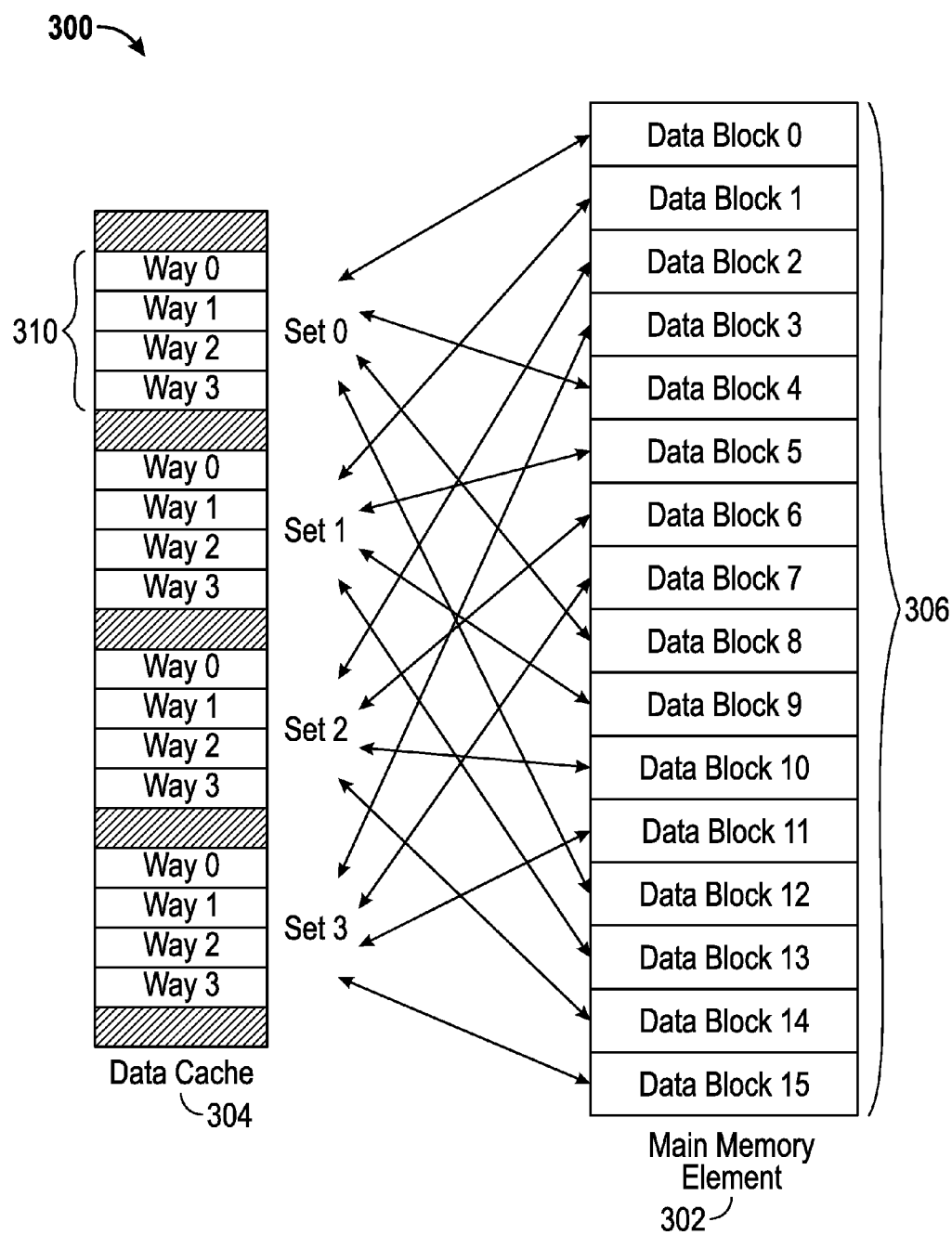
FIG. 3 is a block diagram representation of a data transfer relationship between a main memory and a data cache.

FIG. 3 is a block diagram representation of a data transfer relationship between a main memory element and a data cache, as is well-known in the art. As shown, a partial memory hierarchy 300 contains a main memory element 302 (such as the main memory element 104 shown in FIG. 1) and a data cache 304. The data cache 304 contains four sets (Set 0, Set 1, Set 2, Set 3), which in turn are divided into four ways 310. The total number of sets within a data cache 304 is determined by the size of the data cache 304 and the number of ways 310, and the sets and ways 310 are numbered sequentially. For example, an four-way, set-associative data cache with four sets will contain sets numbered Set 0 through Set 3, and ways numbered Way 0 through Way 3 within each set.

The typical mapping scheme uses the "middle bits" (see "index" bits in FIG. 2) to map the memory addresses to the cache sets. The higher bits (i.e. the "tag" bits in FIG. 2) tell you if you have a hit or miss in a given way of the set. As shown in FIG. 2, for a given Set i, you would be able to store every Nth memory address (where N is the number of sets). In the example shown, in which there are four sets, for Set 0, the following data blocks could be stored: Data Block 0, Data Block 4, Data Block 8, Data Block 12, etc. For Set 1, the following data blocks could be stored: Data Block 1, Data Block 5, Data Block 9, Data Block 13, etc. Because the memory addresses associated with each data block 306 are linear, every Nth address maps into a particular set.

The main memory element 302 is divided into data blocks 306. As used herein, a "block" is a set of bytes stored in contiguous memory locations, which are treated as a unit for coherency purposes, and the terms "block" and "line" are interchangeable. Generally, each data block 306 stored in main memory and the capacity of each cache line are the same size. For example, a system including a main memory consisting of 64 byte data blocks 306 may also include cache lines that are configured to store 64 bytes. However, in some embodiments, a data block 306 may be twice the size of the capacity of each cache line. For example, a system including a main memory consisting of 128 byte data blocks 306 may also include cache lines that are configured to store 64 bytes.

Each data block 306 corresponds to a specific set (Set 0 - Set 3) of the data cache 304. In other words, a data block 306 residing in a specific area (i.e., at a specific address) in the main memory element 302 will automatically be routed to a specific area, or set (Set 0-Set 3), when it is cached. For example, when a system receives a request to manipulate data that is not located within the data cache 304, the data can be imported from the main memory element 302 to the data cache 304. The data is imported into a specific, pre-defined set (Set 0 -Set 3) within the data cache 304, based upon the address of the data block 306 in the main memory element 302.

In some embodiments, the imported data block 306 and the cache line into which the data block 306 is mapped are equivalent in size. However, in some embodiments, the data block 306 may be twice the size of the capacity of the cache line, including an amount of data that would fill the capacity of two cache lines. In this example, the large data block 306 may include multiple addresses, but only the first address (i.e., the address for the starting cache line) is used in mapping the data block 306 into the data cache 304. In this case, configuration information that is specific to the hardware involved is used by the processor to make the necessary calculations to map the second line of the data block 306 into the data cache 304.

The exemplary structures and relationships outlined above with reference to FIG. 1-3 are not intended to restrict or otherwise limit the scope or application of the subject matter described herein. FIG. 1-3, and their descriptions, are provided here to summarize and illustrate the general relationship between data blocks, sets, and ways, and to form a foundation for the techniques and methodologies presented below.

Data Cache Way Prediction

Figure 4:
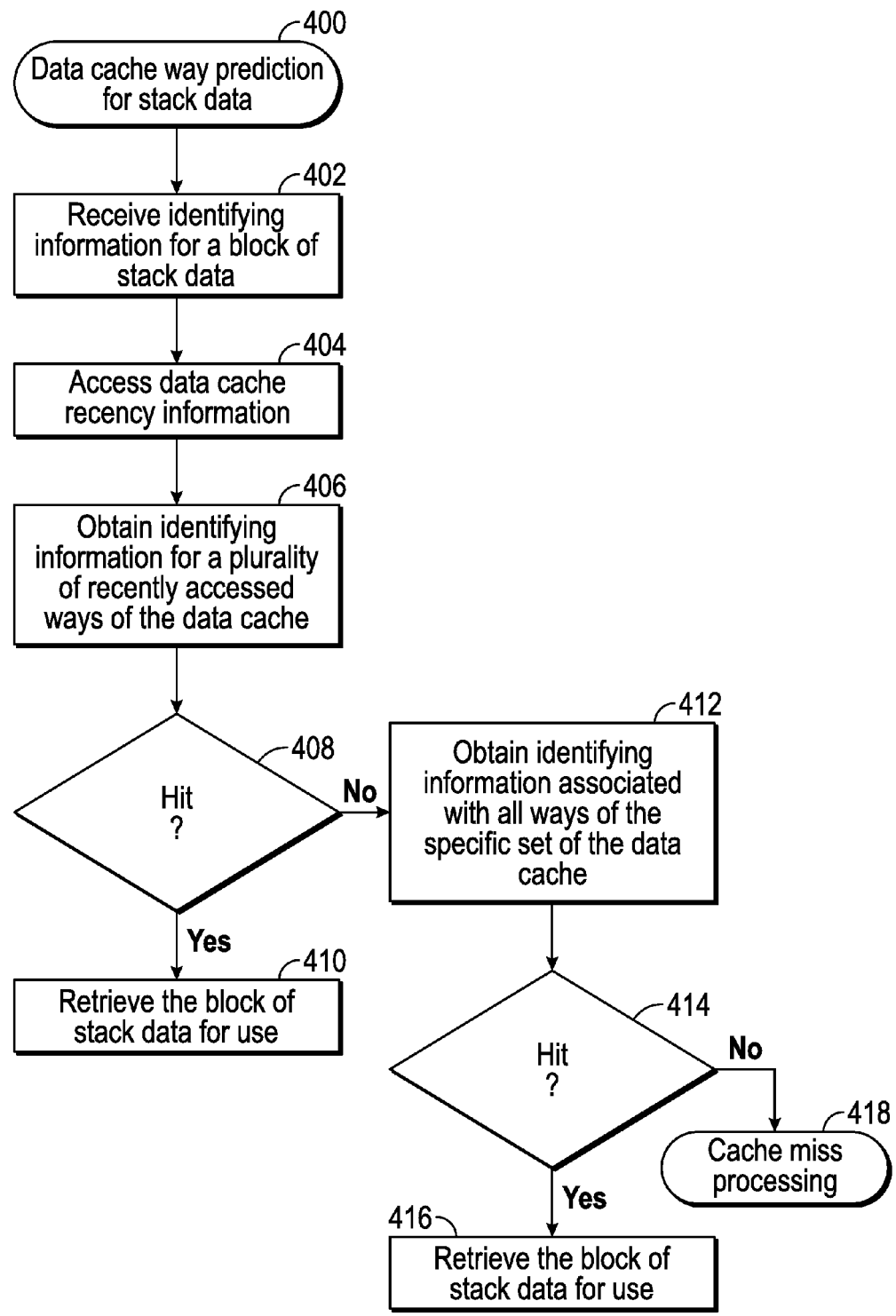
FIG. 4 is a flow chart that illustrates an embodiment of data cache way prediction based on the data being classified as stack data.

FIG. 4 is a flow chart that illustrates an embodiment of data cache way prediction process 400, based on the data being classified as stack data. The various tasks performed in connection with a process described here may be performed by software, hardware, firmware, or any combination thereof. For illustrative purposes, the description of a process may refer to elements mentioned above in connection with FIG. 1-3. In practice, portions of a described process may be performed by different elements of the described system, e.g., the CPU, the cache control circuitry, or other components of the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For case of description and clarity, this example assumes that the data cache way prediction process 400 begins when a process receives identifying information for a block of stack data (402). In certain embodiments, the identifying information is extracted from an instruction to manipulate a block of stack data, sent by a CPU (such as the CPU 102 shown in FIG. 1). This identifying information is associated with the stack data block and is then available to the system for further use. In some embodiments, the identifying information may include main memory location information, detailing a location within main memory where the data block in question is stored. In some embodiments, this memory address may be a physical address, a virtual address, or a combination of both.

In response to receiving the instruction, the process 400 may continue by accessing data cache recency information (404), also known as data cache metadata, which details how recently the contents of each way of the data cache have been accessed. In some embodiments, the process 400 maintains a sequential list of data detailing a most recently used (MRU) way of a particular set within the data cache, a least recently used (LRU) way of the data cache, and a plurality of ways that have been accessed between the MRU and LRU ways of the data cache. This sequential list is maintained for each set within the data cache. The plurality of ways that have been accessed between the MRU and LRU ways of the data cache are generally labeled MRU+1, MRU+2, MRU+3, etc., depending upon how many ways are contained within the data cache. For example, in an eight-way, set-associative cache, there will be an MRU, an LRU, and i MRU ways listed between the MRU and LRU, where i=(N−2). In some embodiments, there may be as few as two ways within the data cache, corresponding to one MRU way and one LRU way on the sequential list, without any ways listed between the MRU and LRU. In practice, the "entries" in such a sequential list are dynamically updated and shifted (if needed) in an ongoing manner in response to accesses to the ways of the data cache.

The process 400 may then continue by obtaining identifying information for a designated number of recently accessed data blocks (406). The recently accessed data blocks may include one or more data blocks in the data cache, and in some embodiments, will include at least the contents of the most recently used (MRU) way of the data cache. In some embodiments, the recently accessed data blocks may include the contents of one or more additional ways of the data cache, such as the MRU+1, MRU+2, etc. ways of the data cache. The number of recently accessed data blocks will depend upon the size of the data cache and possibly user and/or designer preference.

The designated number of recently accessed data blocks that will be used in further processing is determined using the recency information. For example, the recency information details which ways of the data cache have been accessed the most recently (MRU), the next most recently (MRU+1), and so on down the sequential list of data cache ways to the least recently accessed entry (LRU). A designated, or predefined, number of those most recently accessed ways are predicted to contain all stack data blocks that are located within the data cache. Accordingly, the list of designated ways begins with the MRU and continues in sequence to include the designated number of ways. Depending upon the size of the data cache, the designated number of ways may include any subset of the total number of ways included in the sequential list.

In certain implementations, the designated number of most recently accessed ways, which are predicted to contain all stack data blocks within the data cache, is a predetermined number based on the size of the data cache. For example, in an eight-way, set-associative data cache, the designated number may be two, indicating that all stack data blocks will be located within the two most recently accessed ways of the data cache. In other words, all stack data blocks will be located within the ways of the data cache identified as the MRU and the MRU+1. In data caches containing a larger number of ways, the designated number of most recently accessed ways may be increased, and in data caches having a smaller number of ways, the designated number of most recently accessed ways may be decreased. The designated number of most recently accessed ways is a smaller subset of all of the ways contained within the data cache, and the objective in searching a smaller subset of ways to locate stack data is to conserve some of the energy that is usually expended when searching all of the ways of the data cache.

In some embodiments, the prediction that the designated number of most recently accessed ways will contain all stack data blocks within the data cache is based on empirical test results and/or statistical analyses that indicate a very high percentage of occurrences. Specific ways of the data cache are only associated with the recency positions (i.e., MRU, MRU+1, etc.) temporarily, because the recency information changes with every operation. The only exception to this situation occurs when subsequent operations utilize the same data, and the contents of the MRU remain the same. Otherwise, upon each operation the designated subset of ways of the data cache changes, and therefore the ways of the data cache that are predicted to hold all stack data within the data cache change.

In some embodiments, the identifying information obtained at block 406 of FIG. 4 includes main memory location data for the designated number of recently accessed data blocks. In this regard, the process 400 may read a specified number of tags to obtain the identifying information for the designated number of recently accessed data blocks.

In some embodiments, the process 400 obtains the contents of each of the designated number, or subset, of recently accessed data blocks concurrently with obtaining their identifying information. The contents for each of the designated number of recently accessed data blocks are obtained from within a way of the data cache where an identical copy of the data resides, when the original data resides within the system main memory. For example, the system accesses a group of designated tags in a first clock cycle, and rather than waiting for a second clock cycle to access the data associated with the tags and identified as a hit, the contents are accessed at the same time that the tags are accessed. When the determination that there has been a hit in the data cache has been made, the data will already have been accessed. This limits the access time to one clock cycle and is also a power-saving strategy. In some embodiments, the cache control circuitry obtains the contents of only the most recently used (MRU) way of the data cache concurrently with obtaining the identifying information for the MRU. In other words, in some embodiments, this concurrent "identify and obtain" methodology is utilized for the MRU way only, and is not performed for any of the other ways of the data cache.

The process 400 may then proceed to determine if a hit has occurred (408) within the data cache, based upon a comparison of the obtained identifying information for the designated plurality of most recently accessed data blocks to the identifying information for the requested block of stack data (i.e., the block of stack data that is the subject of the instruction received at 402). In this regard, each of the designated plurality of most recently accessed data blocks is associated with separate and distinct identifying information, and each is compared to the identifying information associated with the requested block of stack data. The objective of this comparison is to locate a match, or in other words, to determine whether the identifying information (address) for any of the designated recently accessed data blocks is identical to the identifying information (address) of the requested stack data block.

In accordance with well-established principles, a "hit" occurs when a segment of data that is stored in the main memory of a computer system is requested by the computer system for manipulation, and that segment of data has a more quickly accessible copy located in a data cache of the computer system. Otherwise, the process 400 does not indicate that a hit has occurred. Thus, if the comparison results in a match between the identifying information for the requested block of stack data and the identifying information for one of the designated number of most recently accessed data blocks (i.e., both sets of identifying information are the same), then the process 400 can indicate that both sets of data are the same. Accordingly, if the data being requested from memory (in this case, the stack data block) and the data located within one of the recently accessed ways of the data cache (in this case, a copy of the stack data block) are determined to be the same, then the process 400 will follow the "Yes" branch of the decision block 408. Otherwise, the process 400 follows the "No" branch of the decision block 408.

When a hit has been confirmed (the "Yes" branch of 408), the process 400 retrieves the requested block of stack data for use (410). In some embodiments, the process retrieves the stack data according to a previously received instruction. Because there has been a hit, it is known that one of the designated number of recently accessed ways of the data cache contains a copy of the requested block of stack data. Accordingly, the requested block of stack data can be accessed in the data cache, which has the advantage of occurring more quickly than attempting to access the requested block of stack data at its original location within the system main memory.

Following the retrieval of the block of stack data, the process 400 updates the data cache metadata, which includes recency information. For example, accessing and manipulating the block of stack data could alter which way of the data cache has been the most recently accessed. If necessary, therefore, the system will update the list of the MRU ways of the data cache, by labeling the data cache way holding the requested block of stack data as the "new" MRU. Moreover, the "old" MRU data cache way is shifted down to the MRU+1 space, the old MRU+1 is shifted down to MRU+2, and so on. In other embodiments, however, the process may access and manipulate the same block of stack data, and in this scenario, the list of MRU ways of the data cache would not change following the operation.

FIGS. 5A-5B are block diagram representations that depict data cache recency information before and after updating. FIG. 5A and FIG. 5B show charts listing all of the ways in an exemplary eight-way, set-associative data cache. The entry for each way in the chart has a corresponding entry detailing recency information for that particular way, or how recently each way has been accessed in relation to the other ways in the data cache.

As shown in FIG. 5A, the data contained within Way 0 has been accessed more recently than the contents of any of the other ways of the data cache. In other words, Way 0 is the most recently used (MRU) way of the data cache. In FIG. 5B, Way 4 of the data cache is now marked as the MRU, shifting the rest of the ways of the data cache down one value towards the least recently used (LRU) way of the data cache. This figure shows that, after Way 0 was utilized by the CPU, the contents of Way 4 were then accessed by the CPU. Way 4 is the most recently accessed way of the data cache, otherwise known as the MRU, and Way 0 is now identified as the MRU+1.

Referring back to FIG. 4, when a hit has not been confirmed (the "No" branch of 408), the process 400 may continue substantially as described above, while omitting the filtering of the most recently accessed ways of the data cache. In other words, when the process only checks the pre-specified number of recently accessed data blocks for a copy of a requested stack data block, the pre-specified number of recently accessed data blocks have been filtered out of the total number of data blocks contained within a corresponding set of the data cache. In some embodiments, rather than filtering the most recently accessed ways, the process 400 takes into account the contents of all of the ways in the set. In some embodiments, the "No" branch of 408 causes the process 400 to obtain identifying information associated with all of the ways (412) in the data cache. In some embodiments, the identifying information is found within the tags associated with each way of the data cache.

Next, the process 400 checks whether a hit has occurred (414) within any of the ways of the data cache, by comparing the identifying information for the contents of each of the data cache ways, individually, to the identifying information for the requested block of stack data and seeking a match between the two. Thus, the process 400 may need to repeat some or all of the comparison performed previously.

When a match between the identifying information for the contents of one of the data cache ways and the identifying information for the requested block of stack data is found, a hit is confirmed (the "Yes" branch of 414) within the data cache. The system will then retrieve the requested block of stack data for use (416) from the data cache. When a hit has not been confirmed (the "No" branch of 414), the process 400 reverts to conventional methods of processing a cache miss that are well known in the art (418). At this point, it may be necessary to access or search for the requested stack data block in main memory, or a lower level cache within the computer system, for manipulation. If found in the main memory, the requested stack data block is imported into the data cache for future use, according to conventional cache memory techniques.

Soft-Partitioning of the Data Cache

Figure 6:
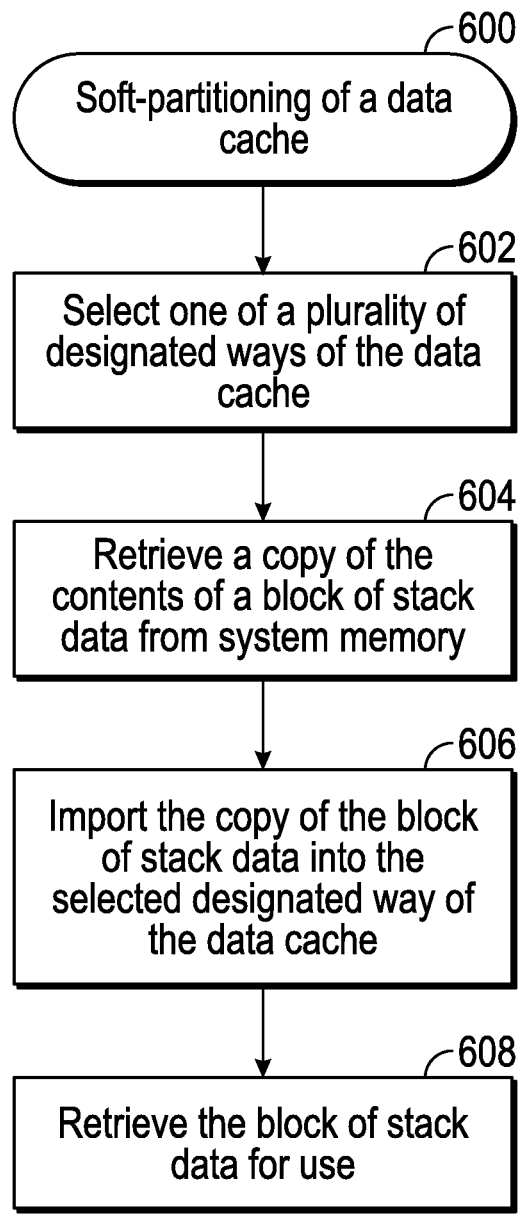
FIG. 6 is a flow chart that illustrates an embodiment of soft-partitioning of a data cache, based on stack or non-stack classification of data.

FIG. 6 is a flow chart that illustrates an embodiment of a process 600 for soft-partitioning a data cache, based on stack or non-stack classification of data. As used here, "soft-partitioning" means storing all stack data within one or more designated ways of the data cache. The designated ways of the data cache will not necessarily always contain stack data only, but any stack data will always be routed to the designated way(s).

For ease of description and clarity, this example assumes that the soft-partitioning of a data cache process 600 begins when a block of stack data is required for use by a computer system, but is not currently accessible from the data cache of the system. The process 600 selects one of a plurality of designated ways of a data cache (602). This is accomplished by first checking each of the plurality of designated ways within the applicable set for an invalid cache line. If there is an invalid line, this particular designated way is then selected. If there is no invalid line, the system will select one of the plurality of designated ways, according to the applicable replacement policy. This selected way is then evicted by removing the contents of the selected, designated way to accommodate new data that will replace it in the way. In accordance with conventional methodologies, the evicted data is removed from the way of the data cache, but continues to reside in its original place within main memory. The plurality of designated ways is a subset of the total ways of the data cache, and will be fewer or equal in number than the total number of ways contained within the data cache. The designated ways are ways in the data cache that have been chosen to hold all stack data that comes into the data cache. In some embodiments, there will be at least one designated way, and the number of designated ways may increase based upon the associativity of the cache. In some embodiments, the ways within the subset of designated ways may be chosen arbitrarily, or may be chosen based upon user and/or designer preference.

Once one of the plurality of designated ways of the data cache has been evicted, the process 600 retrieves a copy of the contents of a block of stack data from system memory (604). In some embodiments, this copy is retrieved from the location in which the block of stack data resides in main system memory. In some embodiments, this copy is retrieved from a lower level cache element within the memory hierarchy. In some embodiments, it is also possible for the copy of the block of stack data to be retrieved from another location in the memory hierarchy of the computer system.

Next, the process 600 imports the copy of the block of stack data into the selected, designated way of the data cache (606), where it will reside until the contents of the designated way are again evicted so that new data may be stored within the designated way. The designated ways are the only ways that are permitted to contain stack data, however, the stack data may be evicted so that it might be replaced within the designated way by non-stack data, depending upon the needs of the computer system. After the copy of the block of stack data is imported into the designated way, the process 600 may retrieve it from the data cache for use by the system(608).

Figure 7:
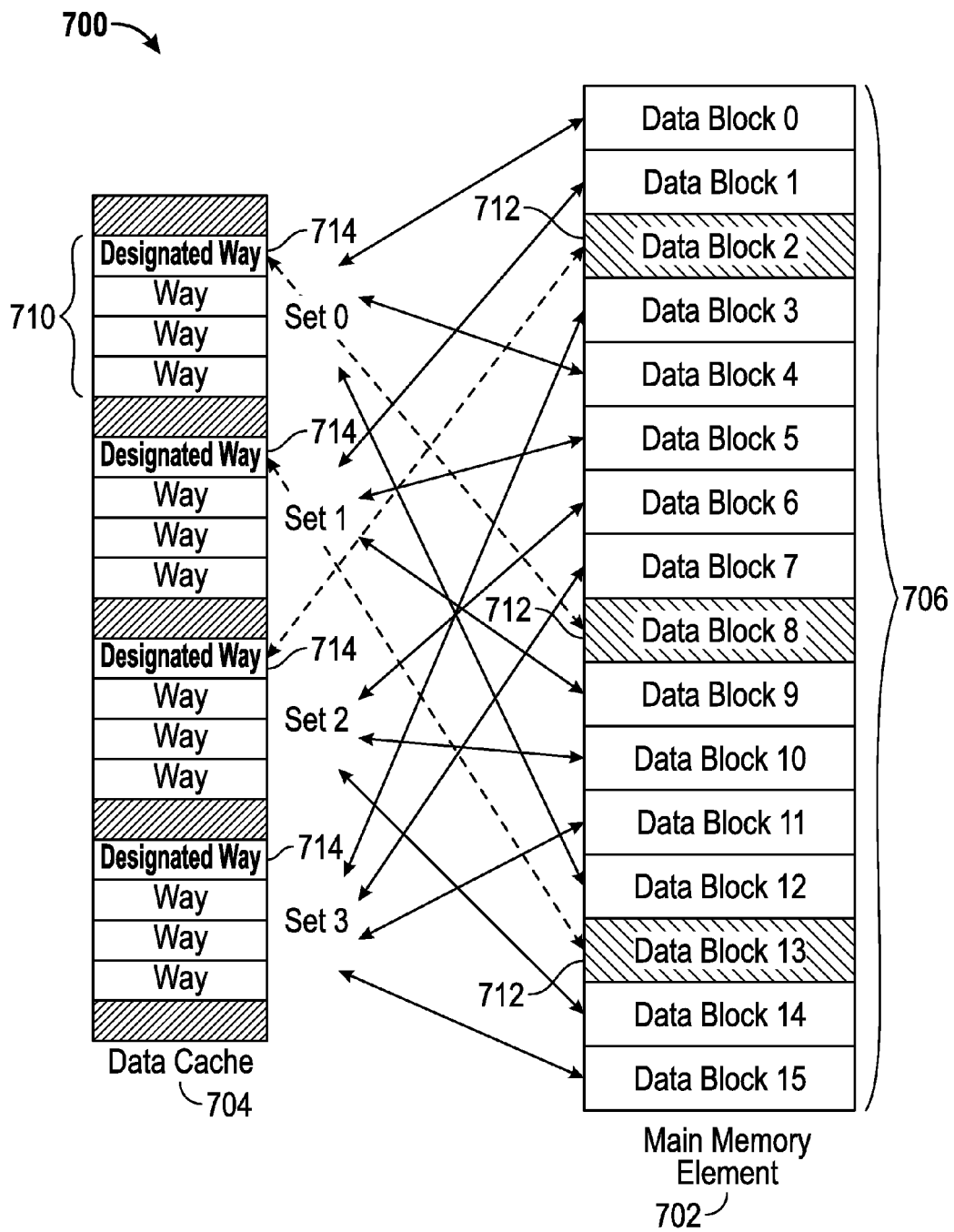
FIG. 7 is a block diagram representation of a data transfer relationship between a main memory element and a data cache, where the data cache includes designated ways for stack data.

This concept of storing stack data within specific way(s) of a data cache is illustrated in FIG. 7. FIG. 7 is a block diagram representation of a data transfer relationship between a main memory element and a data cache, where the data cache includes designated ways for stack data. As shown, a partial memory hierarchy 700 contains a main memory element 702 (such as the main memory element 104 shown in FIG. 1) and a data cache 704. The data cache 704 has four sets (Set 0, Set 1, Set 2, Set 3), which in turn are divided into four of ways 710. Here, the sets and the ways 710 are numbered sequentially. For example, a four-way, set-associative data cache with four sets will contain sets numbered Set 0 through Set 3 and ways numbered Way 0 through Way 3 within each set.

The main memory element 702 is divided into data blocks 706, and each data block 706 corresponds to a specific set of the data cache 704, as is well-known in the art. In this example, three data blocks 706 within the main memory element 702 are designated as stack data blocks 712. However, a certain number of stack data blocks 712 is not required, and will vary based on use of the stack. As shown, stack data blocks 712 are directed into designated ways 714 of the data cache 704. Stack data blocks 712 are not found within any of the other ways 710 of the data cache 704.

Figure 8:
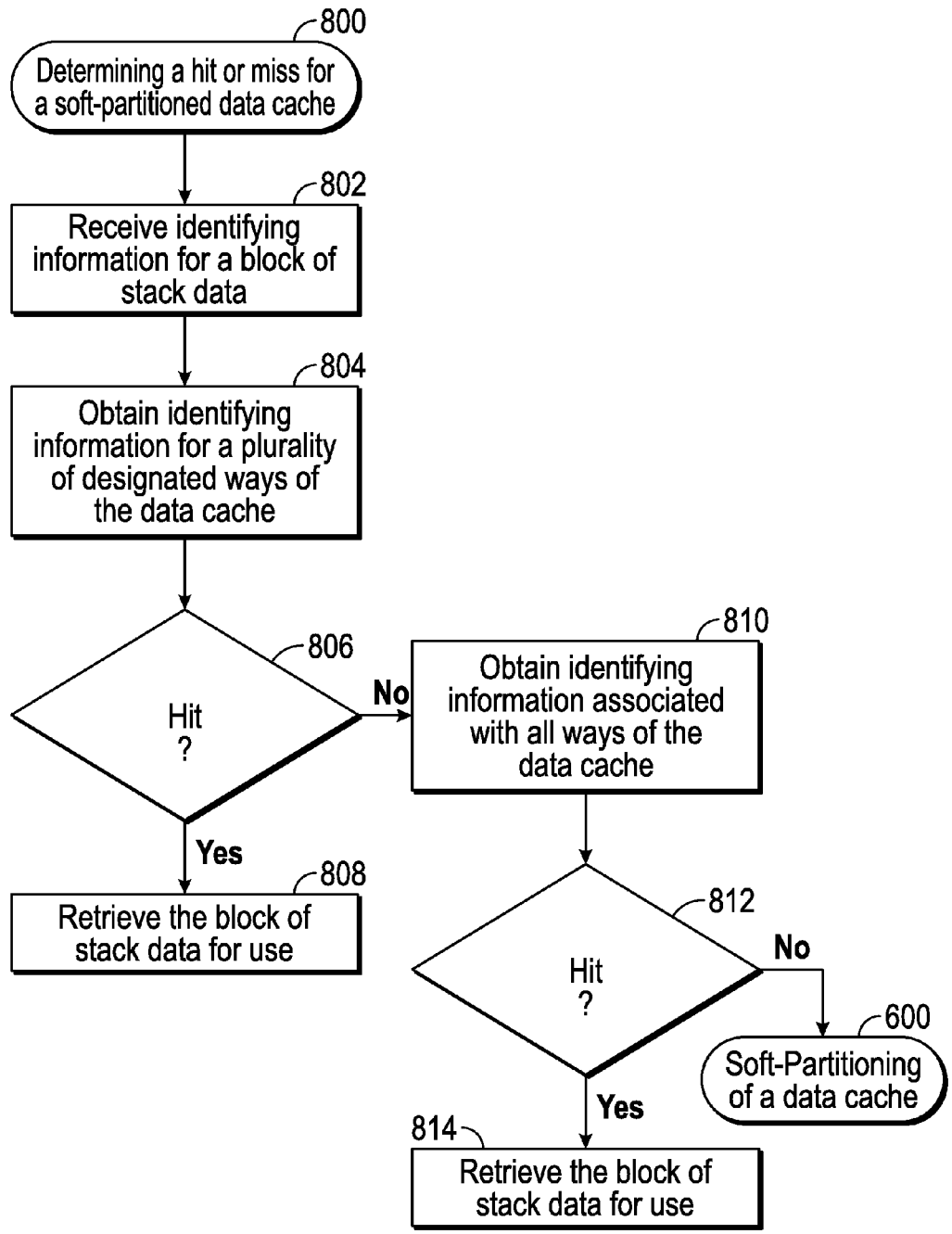
FIG. 8 is a flow chart that illustrates an embodiment of determining a hit or miss for a soft-partitioned data cache.

Before stack data can be stored within one or more designated ways of the data cache, as described in the context of FIG. 6 and as shown in FIG. 7, the system will determine whether the particular block of stack data already resides within the data cache. FIG. 8 is a flow chart that illustrates an embodiment of a process 800 of determining a hit or a miss for a soft-partitioned data cache, based on stack or non-stack classification of data. For ease of description and clarity, this example assumes that the data cache way prediction process 800 begins when a process receives identifying information for a block of stack data (802). The operation performed at 802 is identical to the operation performed at 402 of FIG. 4, which was described in detail above in context of the process 400.

The process 800 obtains identifying information associated with a plurality of designated ways (804) of the data cache. In some embodiments, the plurality of designated ways of the data cache may be selected arbitrarily at design time, based upon user and/or designer preference. In some embodiments, the identifying information includes main memory location data for the recently accessed data blocks. In certain embodiments, the process 800 reads a specified number of tags to obtain identifying information for the designated number of recently accessed data blocks The process 800 may continue by determining whether or not a hit has occurred (806) by comparing the obtained identifying information associated with each of the plurality of designated ways to the identifying information for the requested block of stack data, as described above for the operation 408 of the process 400.

When a hit has been confirmed (the "Yes" branch of 806), the process 800 retrieves the requested block of stack data for use (808), as described previously in the context of the process 400. When a hit has not been confirmed (the "No" branch of 806), the process 800 may continue substantially as described above, while omitting the filtering of the designated ways of the data cache, and instead takes into account the contents of the entire data cache. To do this, the process 800 obtains identifying information associated with all ways (810) of the data cache. In some embodiments, the identifying information includes tags, which contain the address information required to identify whether the associated block in the hierarchy corresponds to a block of data requested by the processor. For example, the identifying information may include unique information associated with the contents of each way of the data cache which correspond to unique information associated with contents of various locations within main memory.

Next, the process 800 may continue by determining whether or not a hit has occurred (812) by comparing the obtained identifying information associated with each of the data cache ways, individually, to the identifying information for the requested block of stack data, as described above for the operation 414 of the process 400.

When a hit has been confirmed (the "Yes" branch of 812) within the data cache, the system will retrieve the requested block of stack data for use (814). When a hit has not been confirmed (the "No" branch of 812), the process 800 exits and the Soft-Partitioning of a Data Cache process 600 begins, as shown in FIG. 6 and described in detail above.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of way prediction for a data cache having a plurality of ways, comprising:
   partitioning the data cache to designate a predetermined subset of the ways for storing stack data, wherein a number of ways in the predetermined subset is less than a total number of the plurality of ways, the ways in the predetermined subset are to store stack data and non-stack data, and stack data is stored only in one of the ways in the predetermined subset;
   responsive to an instruction to access a stack data block, accessing identifying information associated with the predetermined subset of the ways from an array of identifying information corresponding to the plurality of ways to determine whether the stack data block resides in one of the ways in the predetermined subset; and
   when the stack data block resides in one of the ways in the predetermined subset, accessing the stack data block from the data cache; and
   responsive to the stack data block not residing in one of the ways in the predetermined subset,
   retrieving the stack data block from a memory hierarchy and dynamically selecting one of the ways in the predetermined subset to store the stack data block.

2. The method of claim 1, wherein the identifying information references associated contents of each of the ways in the predetermined subset, and corresponds to identifying information for a copy of the associated contents of each of the ways in the predetermined subset, and wherein the copy of the associated contents of each of the ways in the predetermined subset is stored in a second location in a memory hierarchy.

3. The method of claim 2, wherein the predetermined subset of the ways comprises at least two ways.

4. The method of claim 1, wherein accessing the identifying information associated with ways in the predetermined subset comprises reading a plurality of tags, and wherein each of the plurality of tags is associated with an individual one of the ways in the predetermined subset.

5. The method of claim 1, further comprising:
   obtaining contents of each of the ways in the predetermined subset concurrently with accessing the identifying information for each of the ways in the predetermined subset.

6. A set-associative cache memory system, comprising:
   a first array of ways of the cache memory system, wherein the ways are configured to store N recently accessed data blocks, wherein N is an integer greater than one;
   a second array of storage elements, configured to store identifying information associated with the N recently accessed data blocks; and
   cache control circuitry operatively associated with the first and second arrays, wherein the cache control circuitry is configured to respond to a request to access a stack data block by:
      accessing identifying information associated with a designated subset of the first array of ways partitioned for storing stack data to determine whether the stack data block resides in one of the designated ways in the subset, wherein the identifying information is accessed from a subset of the second array of storage elements, corresponding to the ways in the designated subset, the designated subset are to store stack data and non-stack data, a size of the designated subset is less than N, and stack data is stored only in one of the ways in the designated subset; and
      when the stack data block resides in one of the ways in the designated subset of the first array, accessing the stack data block from the first array; and
      responsive to the stack data block not residing in one of the ways in the predetermined subset, retrieving the stack block data from a memory hierarchy and dynamically selecting one of the ways in the predetermined subset to store the stack data block.

7. The set-associative cache memory system of claim 6, wherein, the cache control circuitry is further configured to:
   obtain identifying information associated with the ways in the designated subset;
   compare the identifying information for the stack data block to the identifying information associated with the ways in the designated subset to determine whether a hit has occurred within the cache memory system, wherein the hit occurs when the comparison results in a match; and when a hit has occurred, access the stack data block for manipulation from the cache memory system.

8. The set-associative cache memory system of claim 7, wherein the cache control circuitry is further configured to obtain contents of each of the ways in the designated subset concurrently with obtaining the identifying information associated with the ways in the designated subset.

9. The set-associative cache memory system of claim 7, wherein the cache control circuitry is further configured to obtain contents of only one of the ways in the designated subset concurrently with obtaining the identifying information associated with the ways in the designated subset.

10. A method of way prediction for a data cache comprising a plurality of sets, each of the plurality of sets comprising a plurality of ways, wherein the method comprises:

partitioning the data cache to designate a predetermined subset of the plurality of ways of each set for storing stack data, wherein a number of ways in the predetermined subset is less than a total number of the plurality of ways associated with each set, the ways in the predetermined subset are to store stack data and non-stack data, and stack data is stored only in one of the ways in the predetermined subset;

receiving an instruction, at a processor-based device, to access a stack data block, wherein the instruction comprises a first tag associated with the stack data block;

performing a first tag lookup within a tag array, to determine whether a copy of the first tag resides in a subset of the tag array corresponding to the ways in the predetermined subset; and when a copy of the first tag resides in the subset of the tag array, accessing the stack data block from one of the ways in the predetermined subset corresponding to the copy of the first tag; and responsive to the stack data block not residing in one of the ways in one of the ways in the predetermined subset, retrieving the stack block data from a memory hierarchy and dynamically selecting one of the ways in the predetermined subset to store the stack data block.

11. The method of claim 10, further comprising:

reading contents associated with the plurality of tags concurrently with reading the plurality of tags.

\* \* \* \* \*